United States Patent
Dou et al.

(10) Patent No.: US 11,920,507 B2
(45) Date of Patent: *Mar. 5, 2024

(54) METHOD FOR REGULATING EXHAUST EMISSIONS

(71) Applicant: Deere & Company, Moline, IL (US)

(72) Inventors: Danan Dou, Waterloo, IA (US); Shyan-Cherng Huang, Cedar Falls, IA (US); Taner Tuken, Cedar Falls, IA (US); Thomas M. Harris, Waterloo, IA (US)

(73) Assignee: Deere & Company, Moline, IL (US)

( * ) Notice: Subject to any disclaimer, the term of this patent is extended or adjusted under 35 U.S.C. 154(b) by 414 days.

This patent is subject to a terminal disclaimer.

(21) Appl. No.: 17/150,795

(22) Filed: Jan. 15, 2021

(65) Prior Publication Data

US 2021/0140357 A1 May 13, 2021

Related U.S. Application Data

(60) Division of application No. 15/831,027, filed on Dec. 4, 2017, now Pat. No. 10,927,740, which is a
(Continued)

(51) Int. Cl.
*F01N 3/20* (2006.01)
*B01D 53/94* (2006.01)
(Continued)

(52) U.S. Cl.
CPC .......... *F01N 3/208* (2013.01); *B01D 53/9409* (2013.01); *B01D 53/9477* (2013.01); *B01D 53/9495* (2013.01); *B01J 23/40* (2013.01); *B01J 35/04* (2013.01); *F01N 3/035* (2013.01); *F01N 3/103* (2013.01); *F01N 3/106* (2013.01); *F01N 3/2066* (2013.01); *F01N 9/00* (2013.01); *F01N 9/002* (2013.01); *F01N 11/002* (2013.01); *F01N 11/007* (2013.01); *F01N 13/009* (2014.06); *F01N 13/0093* (2014.06); *B01D 2251/2067* (2013.01); *B01D 2255/102* (2013.01); *B01D 2255/2063* (2013.01); *B01D 2255/2065* (2013.01); *B01D 2255/20707* (2013.01); *B01D 2255/20715* (2013.01); *B01D 2255/20723* (2013.01); *B01D 2255/2092* (2013.01); *B01D 2255/50* (2013.01); *B01D 2255/70* (2013.01); *B01D 2255/904* (2013.01); *B01D 2255/915* (2013.01); *B01D 2258/012* (2013.01);
(Continued)

(58) Field of Classification Search
CPC .......... F01N 3/20; F01N 3/208; F01N 13/009; F01N 13/0093; F01N 3/035; F01N 3/103; F01N 3/106; F01N 3/2066; F01N 9/00; F01N 9/002; F01N 11/002; F01N 11/007256; F01N 2250/02; F01N 2250/05; F01N 2560/02; F01N 2560/021; F01N 2560/026; F01N 2560/05; F01N 2560/06; F01N 2560/07; F01N 2560/08; F01N 2590/08; F01N 2610/02; F01N 2610/146; F01N 2900/0416; F01N 2900/1404; F01N 2900/1812; B01D 53/9409; B01D 53/9477; B01D 53/9495; B01D 53/2251; B01D 53/2067; B01D 2255/102; B01D 2255/2063; B01D 2255/2065; B01D 2255/20707; B01D 2255/20715; B01D 2255/20723; B01D 2255/2092; B01D 2255/50; B01D 2255/70; B01D 2255/904; B01D 2255/915; B01D 2258/012; B01J 23/40; B01J 35/04; Y02T 10/12; Y02T 10/40
USPC .......................................................... 423/212
See application file for complete search history.

(56) References Cited

U.S. PATENT DOCUMENTS 8,904,760 B2  12/2014  Mital
9,616,385 B1 *  4/2017  Huang ............... B01D 53/9495
(Continued)

FOREIGN PATENT DOCUMENTS

| | | |
|---|---|---|
| FR | 2971007 | 8/2012 |
| KR | 20130056401 | 5/2013 |
| WO | 2014016616 | 1/2014 |

OTHER PUBLICATIONS

John Deere, "Technology to Reduce Emissions in Large Engines," brochure (first known to us Mar. 1, 2012) 2 pages.
(Continued)

*Primary Examiner* — Edward M Johnson
(74) *Attorney, Agent, or Firm* — Michael Best & Friedrich LLP

(57) ABSTRACT

An exhaust gas treatment system for an internal combustion engine includes an exhaust gas pathway that receives exhaust gas from the engine, a temperature sensor configured to generate a temperature signal associated with a temperature of the exhaust gas at a position along the exhaust gas pathway, and a reductant source. The system also includes first and second injectors in fluid communication with the reductant source. The first and second injectors are configured to inject reductant into the exhaust gas pathway at first and second rates. The system also includes a first treatment element positioned downstream of the first injector and within the exhaust gas pathway, and a controller in communication with the temperature sensor. The controller is configured to receive the temperature signal from the temperature sensor and adjust at least one of the first rate or the second rate based at least in part on the temperature signal.

12 Claims, 8 Drawing Sheets

Related U.S. Application Data continuation-in-part of application No. 15/472,762, filed on Mar. 29, 2017, now Pat. No. 10,012,122, which is a continuation of application No. 14/870,039, filed on Sep. 30, 2015, now Pat. No. 9,616,385.

(51) Int. Cl.

| | | |
|---|---|---|
| *B01J 23/40* | (2006.01) | |
| *B01J 35/04* | (2006.01) | |
| *F01N 3/035* | (2006.01) | |
| *F01N 3/10* | (2006.01) | |
| *F01N 9/00* | (2006.01) | |
| *F01N 11/00* | (2006.01) | |
| *F01N 13/00* | (2010.01) | |

(52) U.S. Cl.
CPC ...... *F01N 2250/02* (2013.01); *F01N 2550/05* (2013.01); *F01N 2560/02* (2013.01); *F01N 2560/021* (2013.01); *F01N 2560/026* (2013.01); *F01N 2560/05* (2013.01); *F01N 2560/06* (2013.01); *F01N 2560/07* (2013.01); *F01N 2560/08* (2013.01); *F01N 2590/08* (2013.01); *F01N 2610/02* (2013.01); *F01N 2610/146* (2013.01); *F01N 2900/0416* (2013.01); *F01N 2900/1404* (2013.01); *F01N 2900/1812* (2013.01); *Y02T 10/12* (2013.01); *Y02T 10/40* (2013.01)

(56) References Cited

U.S. PATENT DOCUMENTS

| | | | |
|---|---|---|---|
| 10,012,122 B2* | 7/2018 | Huang | B01J 23/40 |
| 2005/0069476 A1 | 3/2005 | Blakeman et al. | |
| 2009/0035194 A1 | 2/2009 | Robel et al. | |
| 2009/0035195 A1 | 2/2009 | Robel et al. | |
| 2010/0064662 A1 | 3/2010 | Hinz et al. | |
| 2010/0180579 A1 | 7/2010 | Huang et al. | |
| 2011/0162347 A1 | 7/2011 | Katare et al. | |
| 2013/0305695 A1 | 11/2013 | Henry et al. | |
| 2015/0337702 A1 | 11/2015 | Ettireddy et al. | |

OTHER PUBLICATIONS

Office Action from the US Patent and Trademark Office for U.S. Appl. No. 15/472,762 dated Dec. 7, 2017 (7 pages).

* cited by examiner

METHOD FOR REGULATING EXHAUST EMISSIONS

CROSS-REFERENCE TO RELATED APPLICATIONS

This application is a divisional of U.S. patent application Ser. No. 15/831,027, filed on Dec. 4, 2017, which is a continuation-in-part of U.S. patent application Ser. No. 15/472,762, filed on Mar. 29, 2017, now U.S. Pat. No. 10,012,122, which is a continuation of U.S. patent application Ser. No. 14/870,039, filed on Sep. 30, 2015, now U.S. Pat. No. 9,616,385, the entire content of each of which is incorporated herein by reference.

BACKGROUND

The present disclosure relates to exhaust systems and more particularly to diesel exhaust treatment systems.

SUMMARY

Diesel exhaust is typically subject to emissions regulations covering a variety of emission components, including particulate matter and nitrogen oxides ($NO_x$). A variety of exhaust treatment devices have been developed to reduce these emission components. For example, a diesel particulate filter (DPF) can be used to trap diesel particulate matter and oxidize soot, and a selective catalytic reduction (SCR) element can be used to convert the $NO_x$ present in exhaust gas into other compounds, such as nitrogen, water, and carbon dioxide. Typically, diesel exhaust fluid (DEF) is injected upstream of the SCR element to provide ammonia, which acts as a reducing agent and reacts with the $NO_x$ in the presence of the SCR catalyst. A selective catalytic reduction on filter (SCR+F) element combines SCR and DPF functionality such that $NO_x$ reduction and particulate matter filtration and oxidation can occur in a single element.

Some exhaust treatment systems also include a diesel oxidation catalyst (DOC) with precious metals (e.g., platinum, palladium, etc.) that act as a catalyst to reduce emission of carbon monoxide, hydrocarbons, and volatile organic compounds. However, particles of the precious metal catalyst may become entrained with the exhaust passing through the DOC, particularly at elevated temperatures. These particles may travel with the exhaust and attach to the filtration material in a downstream DPF or SCR+F element. When ammonia is exposed to the precious metal particles trapped in the DPF or SCR+F element, the ammonia is oxidized by oxygen, reducing ammonia availability for $NO_x$ reduction. In addition, the ammonia itself may produce additional $NO_x$ when it is oxidized. Accordingly, a need exists an exhaust treatment system capable of reducing the amount of reductant present upstream of a DPF or SCR+F element when operating at elevated temperatures, while still providing enough reductant downstream for $NO_x$ reduction.

In one embodiment, a method of treating exhaust gas from an internal combustion engine as the exhaust gas passes through an exhaust gas pathway includes injecting reductant into the exhaust gas pathway at a first location, sensing a temperature of the exhaust gas at a position along the exhaust gas pathway, and comparing the sensed temperature to a threshold temperature. The method also includes injecting reductant into the exhaust gas pathway at a second location upstream of the first location and at a first rate in response to the sensed temperature being less than the threshold temperature, and injecting reductant into the exhaust gas pathway at the second location at a second rate less than the first rate in response to the sensed temperature being greater than or equal to the threshold temperature.

In another embodiment, a method of treating exhaust gas from an internal combustion engine as the exhaust gas passes through an exhaust gas pathway includes injecting reductant, at a first rate, into the exhaust gas pathway at a first location, converting nitrogen oxides (NOx) from the exhaust gas in a first treatment element positioned downstream of the first location, injecting reductant, at a second rate different than the first rate, into the exhaust gas pathway at a second location downstream of the first treatment element, and converting NOx from the exhaust gas in a second treatment element positioned downstream of the second location.

In another embodiment, an exhaust gas treatment system for an internal combustion engine includes an exhaust gas pathway configured to receive exhaust gas from the internal combustion engine, a reductant source, a first injector in fluid communication with the reductant source and configured to inject reductant into the exhaust gas pathway at a first rate, a first treatment element positioned downstream of the first injector and within the exhaust gas pathway, a second injector in fluid communication with the reductant source and positioned downstream of the first treatment element, the second injector configured to inject reductant into the exhaust gas pathway at a second rate different than the first rate, and a second treatment element positioned downstream of the second injector and within the exhaust gas pathway.

Other features and aspects of the disclosure will become apparent by consideration of the following detailed description and accompanying drawings.

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
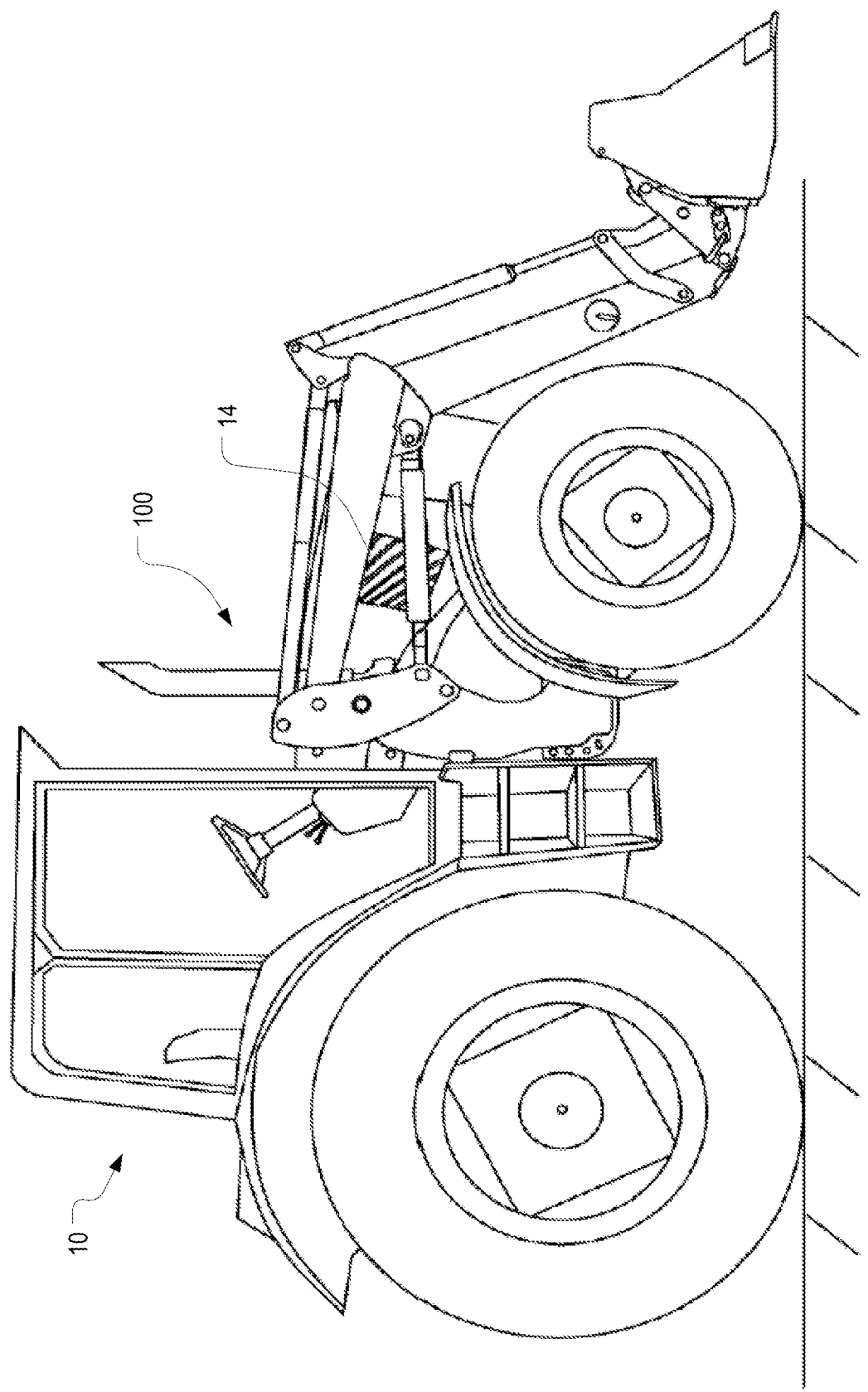
FIG. 1 is a side view of a vehicle in which the disclosed system and method for regulating exhaust emissions may be implemented.

FIG. 1 illustrates an exemplary vehicle 10 including a diesel-powered internal combustion engine 14 and an exhaust gas treatment system 100 according to one embodiment. The illustrated vehicle 10 is a utility tractor, but the exhaust gas treatment system 100 is not so limited in application and can be used in conjunction with any diesel-powered internal combustion engine. For example, the exhaust gas treatment system 100 can be used in other work vehicles, passenger vehicles, or other equipment powered by a diesel engine (e.g., generators, compressors, pumps, and the like).

Figure 2:
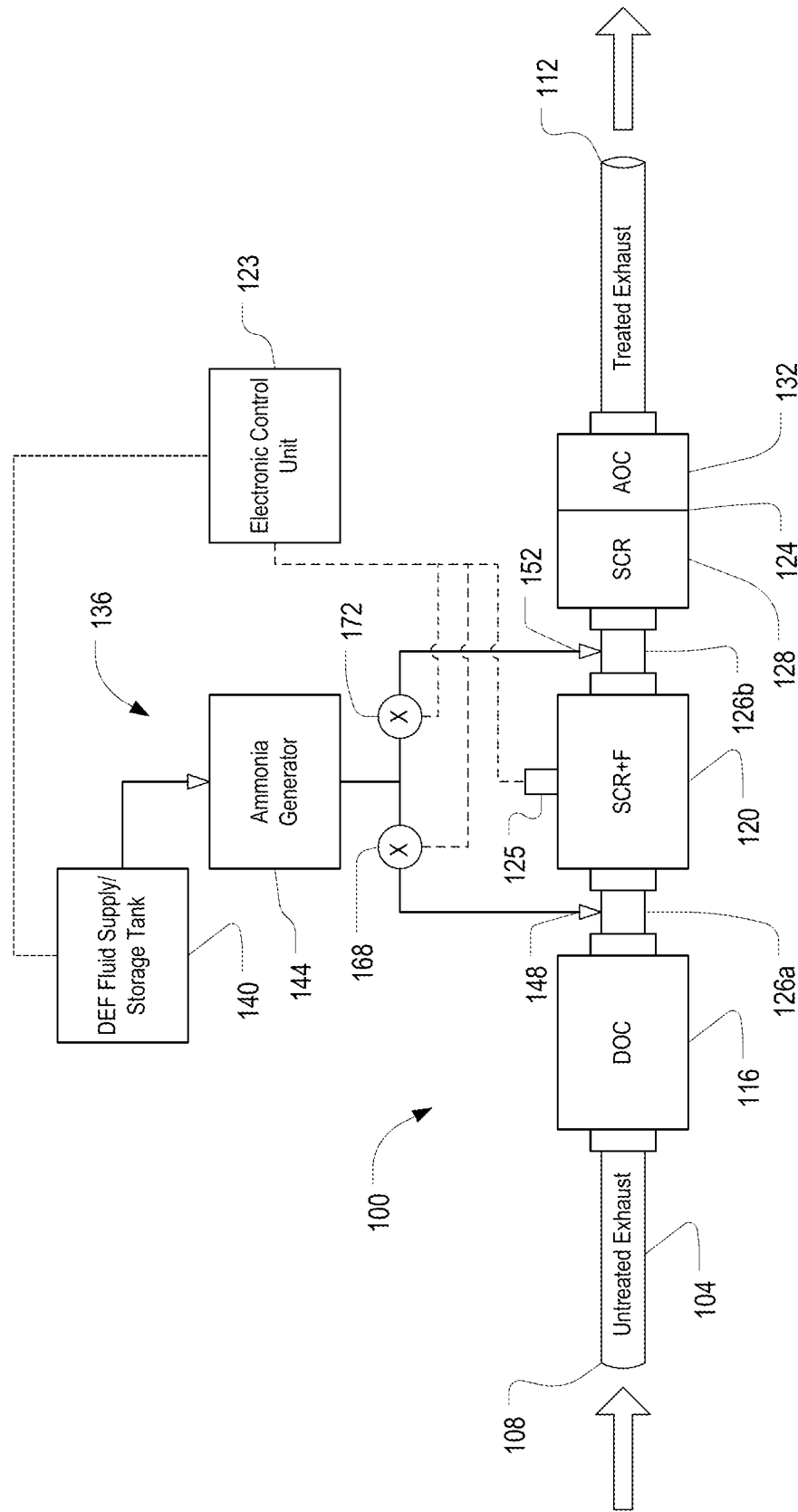
FIG. 2 is a schematic diagram of an exhaust gas treatment system according to one embodiment.

With reference to FIG. 2, the exhaust gas treatment system 100 includes an exhaust pathway 104 (e.g., an exhaust pipe) having an inlet or upstream side 108 and an outlet or downstream side 112. A preliminary treatment element 116, a first treatment element 120, and a second treatment element 124 are located in series along the exhaust pathway 104, between the inlet 108 and the outlet 112. The numeric designations "first," "second," etc. are used herein for convenience and should not be regarded as defining order, quantity, or relative position.

In the illustrated embodiment, an electronic control unit (ECU 123) is provided to actively control various aspects of the operation of the exhaust gas treatment system 100. A sensor 125, which is a pressure drop (ΔP) sensor in the illustrated embodiment, is disposed proximate the first treatment element 120. The sensor 125 is communicatively coupled to the ECU 123 to provide feedback to the ECU 123 indicative of the performance of the exhaust gas treatment system 100. In some embodiments, one or more additional sensors may be provided to monitor various other parameters of the exhaust gas treatment system 100. These sensors may monitor, for example, $NO_x$ concentrations, ammonia concentrations, temperature, exhaust flow rate, and/or ash loading at one or more points along the exhaust pathway 104 and provide feedback to the ECU 123 indicative of the performance of the exhaust gas treatment system 100. In other embodiments, the exhaust gas treatment system 100 may not be actively controlled, and the sensor 125 and/or the ECU 123 may be omitted.

Figure 3:
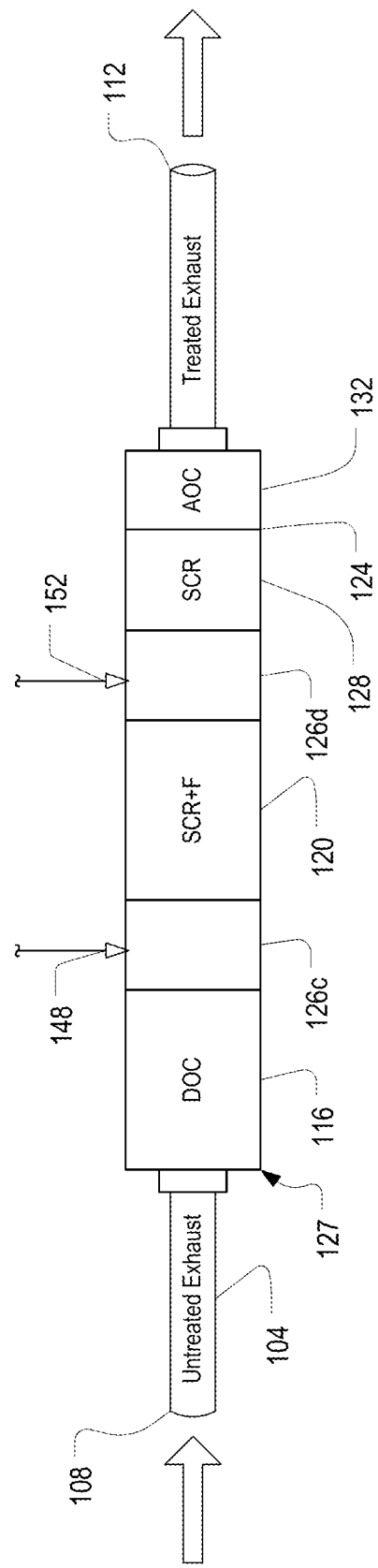
FIG. 3 is a schematic diagram of a portion of an exhaust gas treatment system according to another embodiment.

A first transition pipe 126a interconnects the preliminary and first treatment elements 116, 120, and a second transition pipe 126b interconnects the first and second treatment elements 120, 124. In the illustrated embodiment, the transition pipes 126a, 126b define an outer diameter that is smaller than an outer diameter of the treatment elements 116, 120, 124. In an alternate embodiment illustrated in FIG. 3, the treatment elements 116, 120, 124 are interconnected by transition pipes 126c, 126d. The transition pipes 126c, 126d define an outer diameter that is substantially the same as the outer diameter of the treatment elements 116, 120, 124. As such, the treatment elements 116, 120, 124 and the transition pipes 126c, 126d may collectively define a cylindrical exhaust gas treatment unit 127. In the illustrated embodiment, the transition pipes 126c, 126d each define an overall length that is less than their respective outer diameters. In some embodiments, the transition pipes 126c, 126d each define an overall length between about 30% and about 70% of their respective outer diameters.

The illustrated preliminary treatment element 116 is a diesel oxidation catalyst (DOC) element and includes, for example, a honeycomb support coated with a catalytic material, such as a platinum group metal. The preliminary treatment element 116 may be used to reduce some particulate matter, carbon monoxide, and hydrocarbons from exhaust passing through the DOC element. Alternatively, the preliminary treatment element 116 may include a different exhaust treatment configuration. In some embodiments of the exhaust treatment system 100, the preliminary treatment element 116 may be omitted. In other embodiments, the preliminary treatment element 116 may be included as a portion of a different treatment element (e.g., the first treatment element 120).

The first treatment element 120 in the illustrated embodiment is a combined selective catalytic reduction and diesel particulate filter (SCR+F) element and includes a catalytic washcoat on a porous filter substrate. The washcoat may include one or more base metal oxides, for example, such as $Al_2O_3$, $SiO_2$, $TiO_2$, $CeO_2$, $ZrO_2$, $V_2O_5$, $La_2O_3$. Alternatively or additionally, the washcoat may include one or more zeolites. The first treatment element 120 may be used to capture particulate matter, oxidize soot, and reduce $NO_x$ from exhaust gas passing through the first treatment element 120.

The second treatment element 124 in the illustrated embodiment includes a selective catalytic reduction (SCR) portion 128 and an ammonia oxidation catalyst (AOC) portion 132. The SCR portion 128 may include, for example, a catalytic washcoat on a monolithic support material, such as ceramic. The SCR portion 128 and the AOC portion 132 are positioned in series, with the AOC portion 132 located downstream of the SCR portion 128. The SCR portion 128 may be used to reduce $NO_x$ from exhaust gas passing through the SCR portion 128. The AOC portion 132 may be used to convert excess ammonia leaving the SCR portion 128 to nitrogen and water. In some embodiments, the AOC portion 132 may be omitted. Alternatively, the AOC portion 132 may be provided as a separate treatment element positioned downstream of the second treatment element 124.

With reference to FIG. 2, the exhaust gas treatment system 100 also includes an ammonia source 136, which includes a diesel exhaust fluid (DEF) supply 140 and an ammonia producing unit 144 in the illustrated embodiment. The DEF supply 140 is in fluid communication with the ammonia producing unit 144 to supply DEF (e.g., a urea solution) to the ammonia producing unit 144, which converts the DEF to ammonia gas (e.g., via thermolysis and hydrolysis). In some embodiments, a pump (not shown) is provided to move DEF from the DEF supply 140 to the ammonia producing unit 144. The pump may be variably controlled to vary the amount of DEF supplied to the ammonia producing unit 144, and thus vary the amount of ammonia output by the ammonia producing unit 144. In other embodiments, the DEF may move from the DEF supply 140 to the ammonia producing unit 144 under the influence of gravity. In such embodiments, one or more valves (not shown) may be provided between the DEF supply 140 and the ammonia producing unit 144 to vary the flow of DEF to the ammonia producing unit 144. In some embodiments, the DEF supply 140 may be omitted, and the ammonia producing unit 144 may include an ammonia supply, such as a pressurized ammonia storage tank.

The exhaust gas treatment system 100 further includes a first injector 148 and a second injector 152 in fluid communication with the ammonia producing unit 144. The first injector 148 and the second injector 152 can be directly fluidly coupled to the ammonia producing unit 144 (e.g., by independent conduits), or the first injector 148 and the second injector 152 can be fluidly coupled to a branch line, manifold, or other structure that receives ammonia from the ammonia producing unit 144. The first injector 148 is positioned to introduce ammonia into the first transition pipe 126a, downstream of the preliminary treatment element 116 and upstream of the first treatment element 120 (i.e. between the preliminary and first treatment elements 116, 120). The second injector 152 is positioned to introduce ammonia into the second transition pipe 126b, downstream of the first treatment element 120 and upstream of the second treatment element 124 (i.e. between the first and second treatment elements 120, 124).

Figure 4:
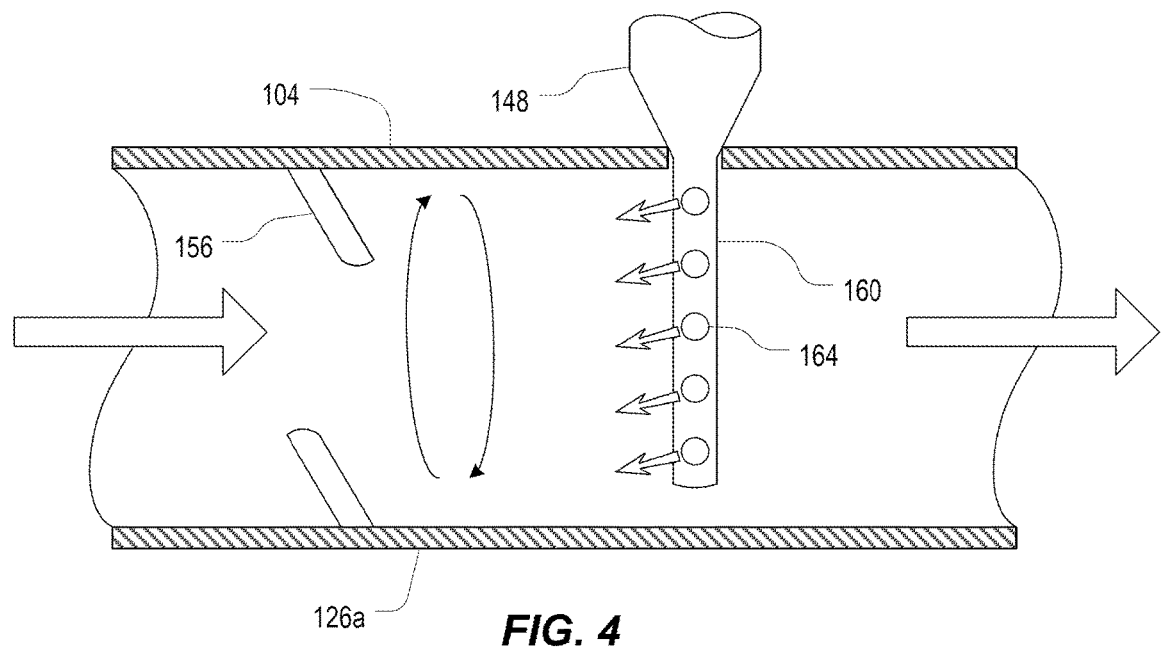
FIG. 4 is a cross-sectional view of a portion of the exhaust gas treatment system of FIG. 2, illustrating a flow-affecting feature according to one embodiment.
Figure 5:
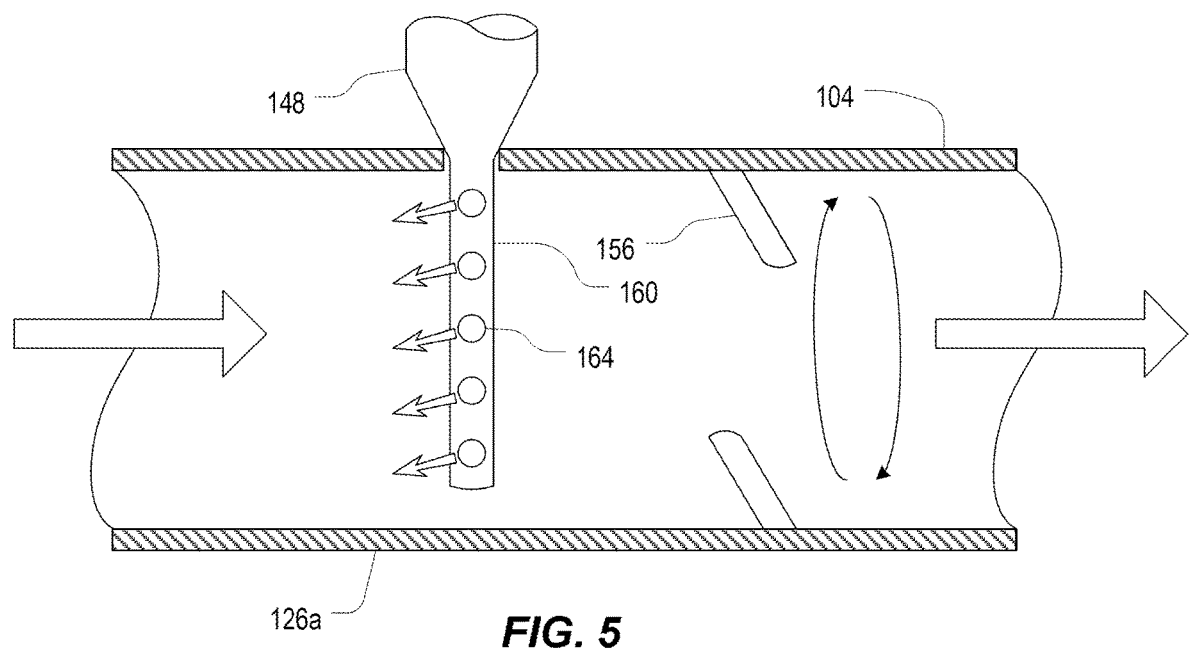
FIG. 5 is a cross-sectional view of a portion of the exhaust gas treatment system of FIG. 2, illustrating a flow-affecting feature according to another embodiment.

Referring to FIG. 4, the exhaust gas treatment system 100 may further include a flow affecting feature 156 in the exhaust pathway 104, positioned upstream of the first injector 148. In the illustrated embodiment, the flow affecting feature 156 is positioned within the first transition pipe 126a. The flow affecting feature 156 can be, for example, one or more fins, vanes, projections, or other suitable means to impart turbulence or swirling into the exhaust flow proximate the first injector 148. With reference to FIG. 5, in another embodiment, the flow affecting feature 156 may be positioned downstream of the first injector 148. Although not illustrated in FIG. 4 or FIG. 5, another flow affecting feature may be positioned in the second transition pipe 126b upstream or downstream of the second injector 152.

With continued reference to FIGS. 4 and 5, the first injector 148 may include an elongated portion 160 that extends into the exhaust pathway 104. A plurality of openings 164 in the elongated portion 160 allows ammonia to be expelled from the injector 148 at multiple locations in the exhaust pathway 104. Although not illustrated in FIG. 3, the second injector 152 may have a similar configuration.

With reference to FIG. 2, a first valve 168 is disposed between the ammonia producing unit 144 and the first injector 148, and a second valve 172 is disposed between the ammonia producing unit 144 and the second injector 152. In some embodiments, the first and second valves 168, 172 can be incorporated into the respective injectors 148, 152 or into the ammonia producing unit 144. In other embodiments, the exhaust treatment system 100 may include only one valve (i.e., the first valve 168 or the second valve 172). Alternatively, in some embodiments, the valves 168, 172 may be omitted.

Each of the illustrated valves 168, 172 is movable between a closed position in which the flow of ammonia through the valve 168, 172 is substantially inhibited, and an open position in which the flow of ammonia through the valve 168, 172 is substantially uninhibited. In some embodiments, one or both of the valves 168, 172 can also be actuated to at least one intermediate position, between the closed and open positions, in which the flow of ammonia through the valve 168, 172 is partially restricted. In some embodiments, one or both of the valves 168, 172 can be modulated to vary the flow rate of ammonia. In the illustrated embodiment, the valves 168, 172 are controlled by the ECU 123.

Figure 6:
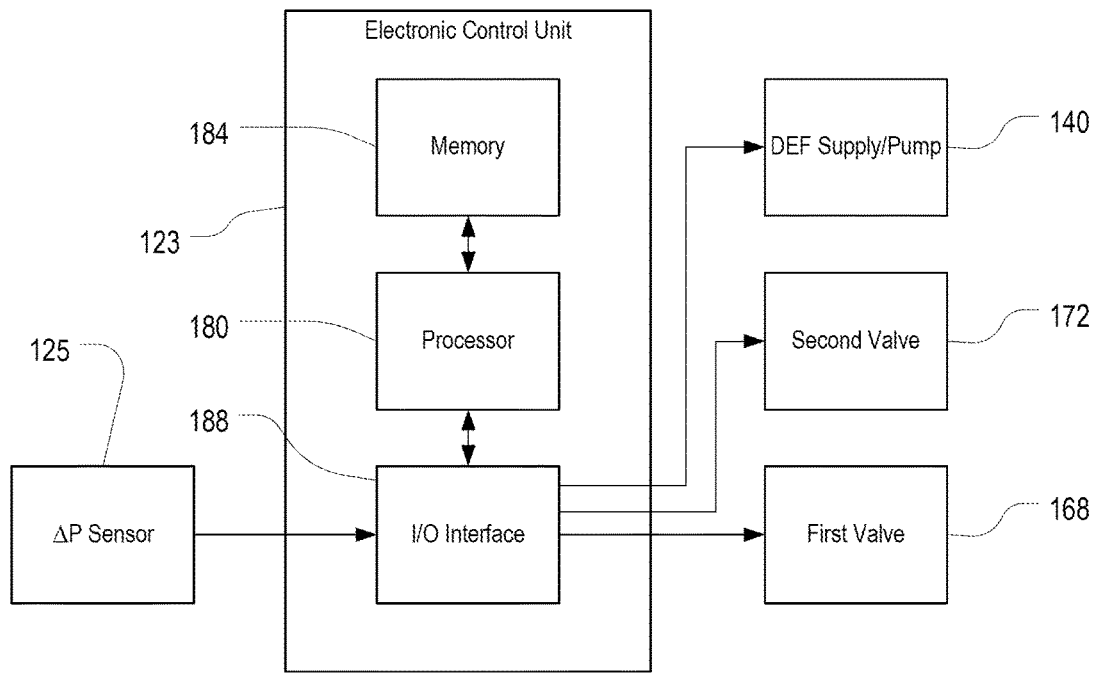
FIG. 6 is a block diagram of an electronic control unit of the exhaust gas treatment system of FIG. 2.

FIG. 6 illustrates an example of the ECU 123 for control of the exhaust gas treatment system 100. The ECU 123 includes a plurality of electrical and electronic components that provide power, operational control, and protection to the components and modules within the ECU 123. In particular, the ECU 123 includes, among other things, an electronic processor 180 (e.g., a programmable microprocessor, microcontroller, or similar device), non-transitory, machine-readable memory 184, and an input/output interface 188. The electronic processor 180 is communicatively coupled to the memory 184 and configured to retrieve from memory 184 and execute, among other things, instructions related to the control processes and methods described herein. In other embodiments, the ECU 123 includes additional, fewer, or different components. In the illustrated embodiment, the ECU 123 is communicatively coupled to the sensor 125, the DEF supply 140, the first valve 168, and the second valve 172. The ECU 123 may also be configured to communicate with external systems including, for example, engine controls and/or operator controls.

In operation, untreated exhaust from the internal combustion engine 14 (FIG. 1) is directed into the exhaust pathway 100 at the inlet 104 (FIG. 2). The exhaust then flows through the preliminary treatment (DOC) element 116, which reduces some particulate matter, carbon monoxide, and hydrocarbons from the exhaust. Ammonia is introduced into the partially-treated exhaust downstream of the preliminary treatment element 116 via the first injector 148. Because the first injector 148 includes multiple holes 164, the ammonia is more uniformly dispersed into the exhaust stream (FIG. 4). In addition, turbulence or swirling movement imparted by the flow affecting feature 156 enhances mixing to create a relatively homogeneous mixture of exhaust and ammonia within a relatively short distance from the injector 148. Thus, the distance between the preliminary and first elements 116, 120 can be minimized.

The ammonia and exhaust mixture then enters the first treatment (SCR+F) element 120 (FIG. 2). The ammonia reacts with $NO_x$ in the presence of the catalyst to form nitrogen and water, while soot is captured and oxidized on the porous filter substrate. When the exhaust exits the first treatment element 120, additional ammonia is introduced via the second injector 152. Like the first injector 148, the second injector 152 preferably includes a plurality of holes (not shown), to more uniformly disperse the ammonia into the exhaust stream, and an additional flow affecting feature (not shown) is preferably provided proximate the second injector 152 to further enhance mixing. Thus, the distance between the first and second treatment elements 120, 124 can be minimized.

The ammonia and exhaust mixture then enters the second treatment element 124, where the ammonia reacts with any remaining $NO_x$ in the SCR portion 128, and any unreacted ammonia is subsequently oxidized in the AOC portion 132. The treated exhaust then exits the exhaust gas treatment system 100 through the outlet 108.

The amount of $NO_x$ converted in the first and second treatment elements 120, 124 is dependent upon the amount of ammonia injected. In the illustrated embodiment, the total amount of ammonia injected is controlled by the rate at which DEF is supplied to the ammonia producing unit 144. DEF flows from the DEF supply 140 to the ammonia producing unit 144 at a rate that may be controlled by the ECU 123, and the ammonia producing unit 144 produces ammonia gas from the DEF. The ammonia gas flows from the ammonia producing unit 144, through the valves 168, 172, and to the injectors 148, 152, which inject the ammonia into the exhaust pathway 104.

Because proper soot oxidation in the first treatment element 120 requires the presence of $NO_x$ (specifically, $NO_2$), the amount of ammonia flowing through the first injector 148 is limited so that some of the $NO_x$ remains unreacted through the first treatment element 120. In the illustrated embodiment, ammonia flows through the first injector 148 at a first rate, and ammonia flows through the second injector 152 at a second rate that is greater than the first rate. The ECU 123 may adjust the flow of ammonia into the exhaust pathway 104 by modulating the first valve 168, the second valve 172, and/or the rate at which DEF flows to the ammonia producing unit 144.

Figure 7:
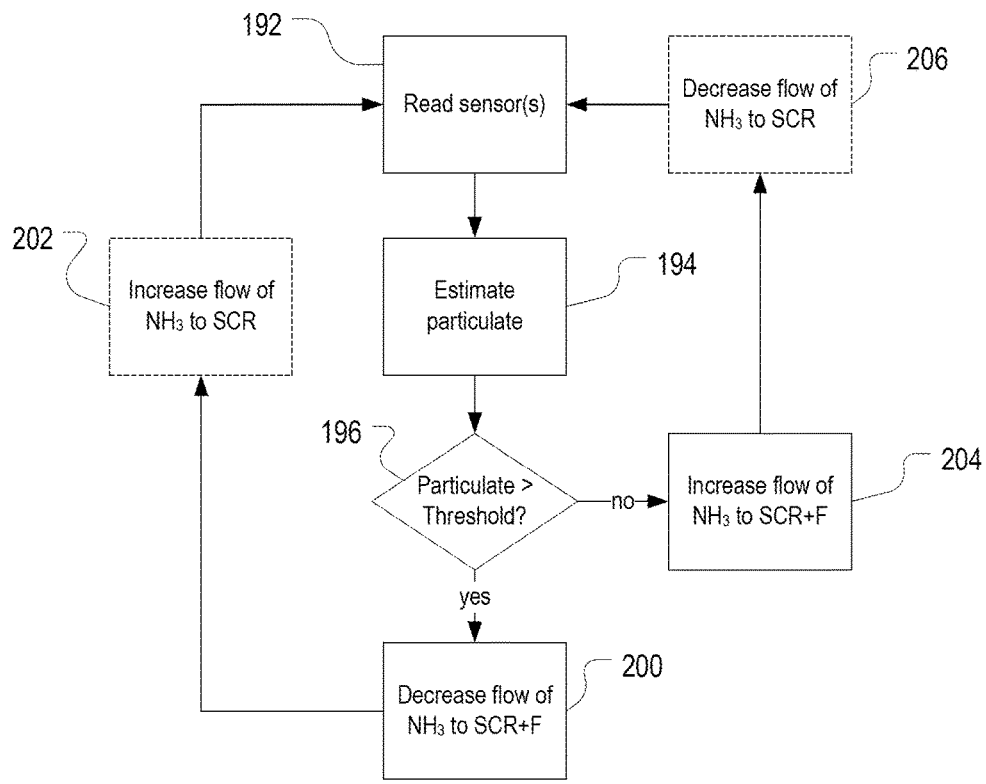
FIG. 7 is a flow diagram of operation of the exhaust gas treatment system of FIG. 2.

With reference to FIG. 7, the ECU 123 may periodically or continuously read a value or signal from the sensor 125 at block 192 (via the input/output interface 188), which is indicative of the pressure drop across the first treatment element 120. The ECU 123 uses the sensed value to determine whether the first treatment element 120 is properly oxidizing soot. The pressure drop may be correlated with the amount of soot or particulate present in the first treatment element 120. For example, as the amount of particulate in the first treatment element 120 increases, the pressure drop increases, and as the amount of particulate in the first treatment element 120 decreases, the pressure drop decreases. From this correlation, the ECU 123 can determine an estimated particulate parameter at block 194, which may correspond with an estimated amount of particulate in the first treatment element 120. In some embodiments, the ECU 123 may periodically or continuously read a value or signal from one or more additional or alternative sensors (e.g., $NO_x$ sensors, ammonia sensors, temperature sensors, ash loading sensors, exhaust flow rate sensors, etc.). The values or signals from these sensors may be factored into the ECU's determination of the estimated particulate parameter.

At block 196, the ECU 123 may then periodically or continuously compare the estimated particulate parameter with a threshold value or value range, stored in memory 184, which is representative of a target soot oxidation performance level. If the estimated particulate parameter is greater than the threshold value (i.e., if the level of particulate in the first treatment element 120 is high), the ECU 123 decreases the flow of ammonia through the first injector 148 at block 200 by restricting flow through the first valve 168. Accordingly, the amount of $NO_x$ available for soot oxidation will increase. Optionally, the ECU 123 may then increase the flow of ammonia through the second injector 152 at block 202 by opening the second valve 172. If the estimated particulate parameter is less than the threshold value (i.e., if the level of particulate in the first treatment element 120 is low), the ECU 123 can increase the flow of ammonia through the first injector 148 at block 204 by opening the first valve 168. Accordingly, the amount of $NO_x$ will be reduced. Optionally, the ECU 123 may then decrease the flow of ammonia through the second injector 152 at block 206 by restricting flow through the second valve 172. In embodiments where either the first valve 168 or the second valve 172 is omitted, the first and second injectors 148, 152 are in fluid communication such that an increase in flow through the first injector 148 results in a proportional decrease in flow through the second injector 152, and vice versa.

Figure 8:
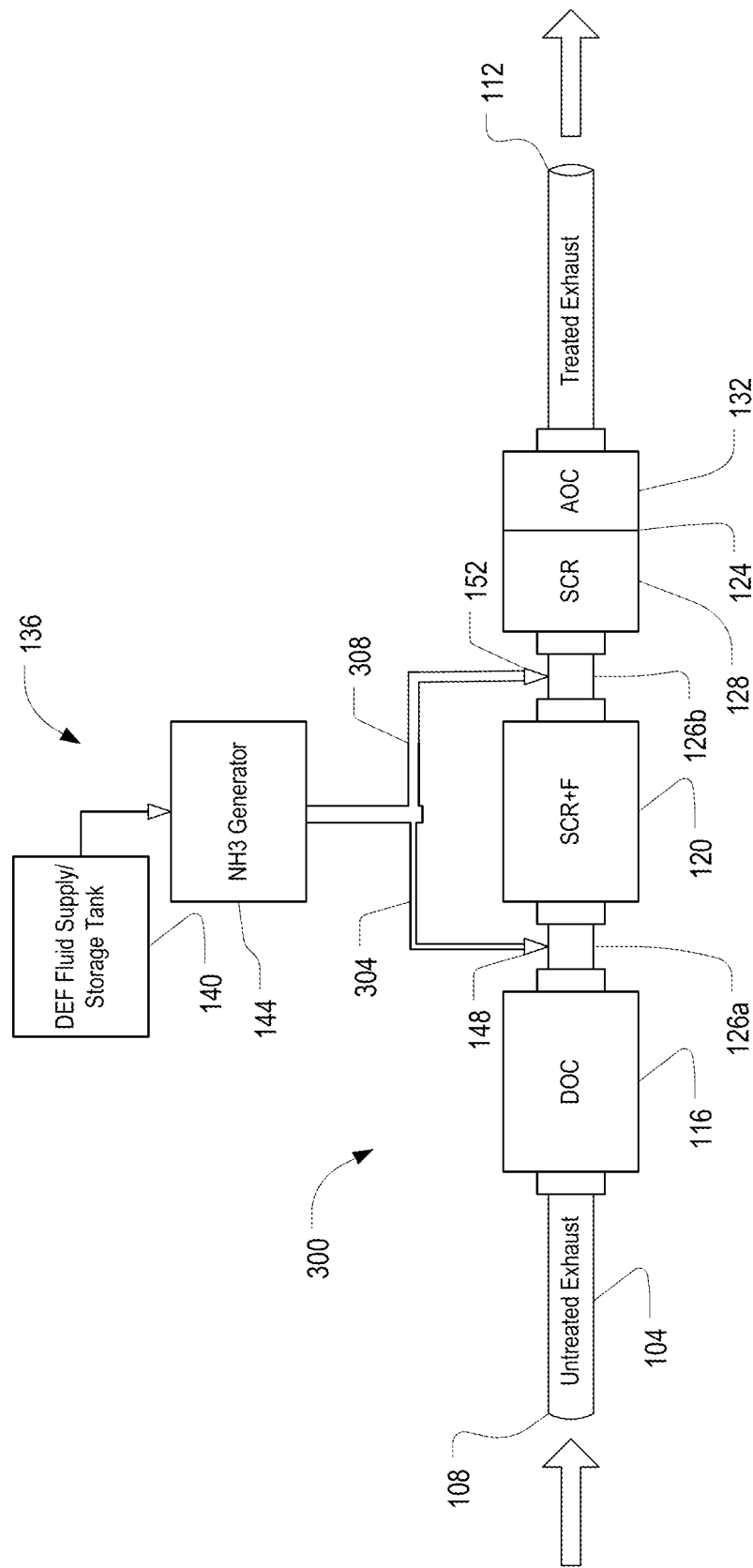
FIG. 8 is a schematic diagram of an exhaust gas treatment system according to another embodiment.

FIG. 8 illustrates an exhaust gas treatment system 300 according to another embodiment. The exhaust gas treatment system 300 is similar to the exhaust gas treatment system 100 described above with reference to FIGS. 1-7. Accordingly, like features are given identical reference numbers, and only differences between the exhaust gas treatment system 300 and the exhaust gas treatment system 100 are described in detail.

The exhaust gas treatment system 300 includes a first ammonia passageway 304 extending between the ammonia producing unit 144 and the first ammonia injector 148 and a second ammonia passageway 308 extending between the ammonia producing unit 144 and the second ammonia injector 152. The first ammonia passageway 304 defines a first diameter, and the second ammonia passageway 308 defines a second diameter that is greater than the first diameter. In some embodiments, the passageways 304, 308 may have the same outer diameter but different inner diameters. In other embodiments, the passageways 304, 308 may have the same outer and inner diameters, and the first passageway 304 may include a restriction that reduces the effective inner diameter of the first passageway 304.

In operation, ammonia flows from the ammonia producing unit 144 to the injectors 148, 152 via the respective passageways 304, 308. Because the first passageway 304 is relatively restricted compared to the second passageway 308, ammonia flows through the first injector 148 at a first rate and through the second injector 152 at a second rate greater than the first rate. The passageways 304, 308 are sized to provide some $NO_x$ reduction in the first treatment element 120 and a greater amount of $NO_x$ reduction in the SCR portion 128 of the second treatment element 124. This configuration may preserve enough $NO_x$ in the first treatment element 120 for effective soot oxidation.

Figure 9:
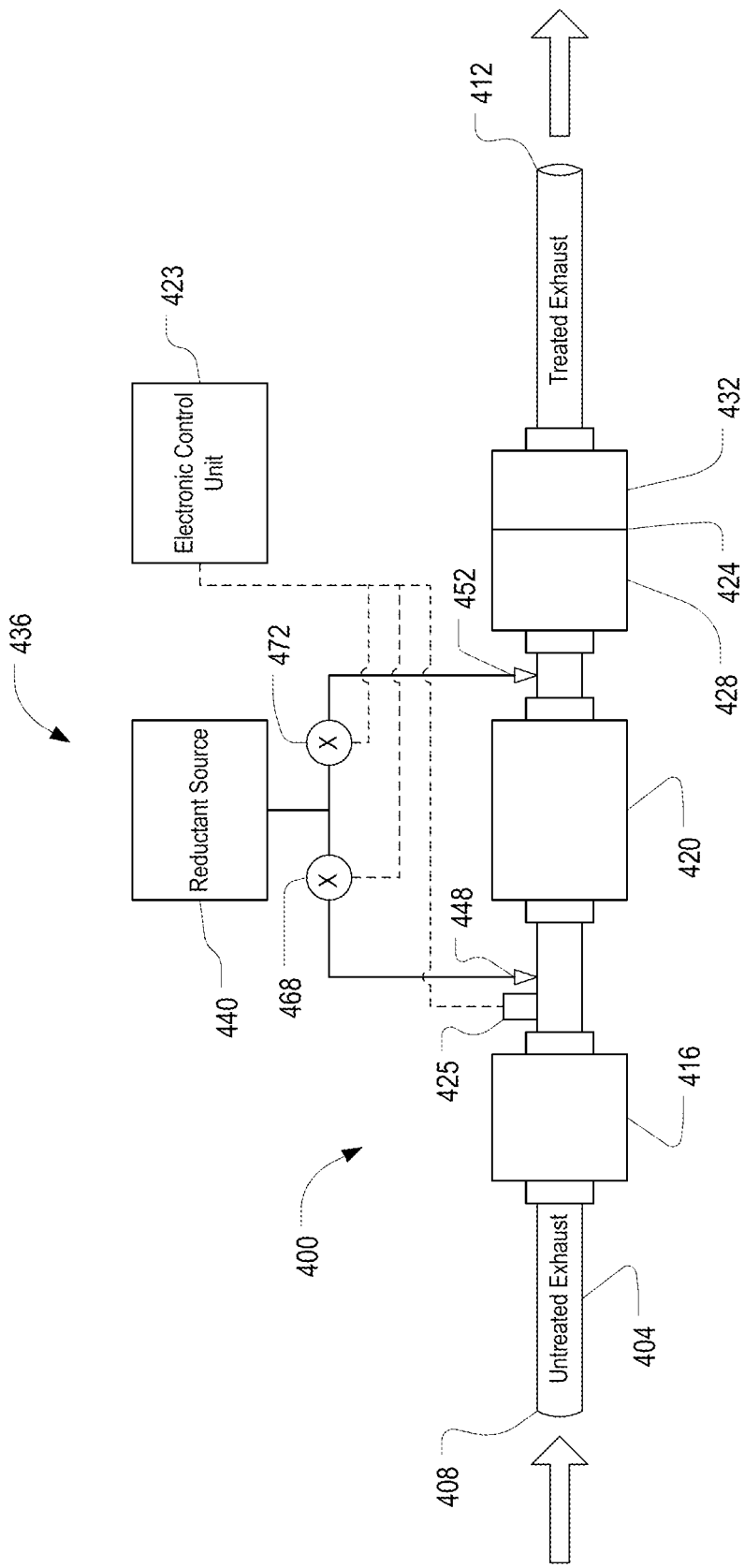
FIG. 9 is a schematic diagram of an exhaust gas treatment system according to another embodiment.

FIG. 9 illustrates an exhaust gas treatment system 400 according to another embodiment. The exhaust gas treatment system 400 is similar to the exhaust gas treatment system 100 described above with reference to FIGS. 1-7. Accordingly, features and elements of the exhaust gas treatment system 400 corresponding with features and elements of the exhaust gas treatment system 100 are given like reference numbers plus 300.

With reference to FIG. 9, the exhaust gas treatment system 400 includes an exhaust pathway 404 (e.g., an exhaust pipe) having an inlet or upstream side 408 and an outlet or downstream side 412. In the illustrated embodiment, a preliminary treatment element 416, a first treatment element 420, and a second treatment element 424 are located in series along the exhaust pathway 404, between the inlet 408 and the outlet 412. The numeric designations "first," "second," etc. are used herein for convenience and should not be regarded as defining order, quantity, or relative position. The illustrated exhaust gas treatment system 400 also includes an electronic control unit (ECU 423) to actively control various aspects of the operation of the exhaust gas treatment system 400, described in greater detail below.

The illustrated preliminary treatment element 416 is a diesel oxidation catalyst (DOC) element and includes, for example, a honeycomb support coated with a catalytic material, such as a platinum group or other precious metal. The preliminary treatment element 416 may be used to reduce some particulate matter, carbon monoxide, and hydrocarbons from exhaust passing through the preliminary treatment element. Alternatively, the preliminary treatment element 416 may include a different exhaust treatment configuration. For example, the preliminary treatment element 416 may additionally or alternatively include a $NO_x$ trap, $NO_x$ storage catalyst, or a combination of the two.

The first treatment element 420 can be a diesel particulate filter (DPF) element able to capture particulate matter and oxidize soot from exhaust gas passing through the first treatment element 420. Alternatively, the first treatment element 420 can be a combined selective catalytic reduction and diesel particulate filter (SCR+F) element including a catalytic washcoat on a porous filter substrate. The washcoat may include one or more base metal oxides, for example, such as $Al_2O_3$, $SiO_2$, $TiO_2$, $CeO_2$, $ZrO_2$, $V_2O_5$, $La_2O_3$. Alternatively or additionally, the washcoat may include one or more zeolites. In such embodiments, the first treatment element 420 can capture particulate matter, oxidize soot, and reduce $NO_x$ from exhaust gas passing through the first treatment element 420.

The second treatment element 424 in the illustrated embodiment includes a selective catalytic reduction (SCR) portion 428 and an ammonia oxidation catalyst (AOC) portion 432. The SCR portion 428 may include, for example, a catalytic washcoat on a monolithic support material, such as ceramic. The SCR portion 428 and the AOC portion 432 are positioned in series, with the AOC portion 432 located downstream of the SCR portion 428. The SCR portion 428 may be used to reduce $NO_x$ from exhaust gas passing through the SCR portion 428. The AOC portion 432 may be used to convert excess ammonia leaving the SCR portion 428 to nitrogen and water. In some embodiments, the AOC portion 432 may be omitted. Alternatively, the AOC portion 432 may be provided as a separate treatment element positioned downstream of the second treatment element 424.

With continued reference to FIG. 9, the exhaust gas treatment system 400 also includes a reductant source 440 for supplying reductant (e.g., ammonia gas or a urea solution such as DEF) into the exhaust gas treatment system 400. In some embodiments, the reductant source 440 may include an ammonia producing unit to convert DEF to ammonia gas (e.g., via thermolysis and hydrolysis). A first injector 448 and a second injector 452 are in fluid communication with the reductant source 440. The first injector 448 and the second injector 452 can be directly fluidly coupled to the reductant source 440 (e.g., by independent conduits), or the first injector 448 and the second injector 452 can be fluidly coupled to a branch line, manifold, or other structure that receives reductant from the reductant source. The first injector 448 is positioned to introduce reductant into the exhaust pathway 404 at a first location downstream of the preliminary treatment element 416 and upstream of the first treatment element 420 (i.e. between the preliminary and first treatment elements 416, 420). The second injector 452 is positioned to introduce reductant into the exhaust pathway 404 at a second location downstream of the first treatment element 420 and upstream of the second treatment element 424 (i.e. between the first and second treatment elements 420, 424). In some embodiments, the exhaust gas treatment system 400 may include one or more flow affecting features (such as the flow affecting feature 156 described above with reference to FIGS. 4 and 5) to facilitate mixing reductant from the injectors 448, 452 into the exhaust gas within a relatively short distance.

In the embodiment illustrated in FIG. 9, a first valve 468 is disposed between the reductant source 440 and the first injector 448, and a second valve 472 is disposed between the reductant source 440 and the second injector 452. In some embodiments, the first and second valves 468, 472 can be incorporated into the respective injectors 448, 452 or into the reductant source 440. In other embodiments, the exhaust treatment system 400 may include only one valve (i.e., the first valve 468).

Each of the illustrated valves 468, 472 is movable between a closed position in which the flow of reductant through the valve 468, 472 is substantially inhibited, and an open position in which the flow of reductant through the valve 468, 472 is substantially uninhibited. In some embodiments, one or both of the valves 468, 472 can also have at least one intermediate position, between the closed and open positions, in which the flow of reductant through the valve 468, 472 is partially restricted. In some embodiments, one or both of the valves 468, 472 can be modulated to vary the flow rate of reductant. In the illustrated embodiment, the valves 468, 472 are controlled by the ECU 423.

With continued reference to FIG. 9, a temperature sensor 425 is coupled to the exhaust pathway 404 at a location upstream of the first treatment element 420, and in the illustrated embodiment, the temperature sensor 425 is disposed between the preliminary treatment element 416 and the first treatment element 420. The temperature sensor 425 may be a thermistor, thermocouple, resistance temperature detector, infrared sensor, or any other sensor suitable for measuring the temperature of exhaust gas. All or a portion of the temperature sensor 425 may extend into the exhaust pathway 404 so as to be directly exposed to exhaust gas. Alternatively, the temperature sensor 425 may be located outside the exhaust pathway 404 and measure the temperature of the exhaust gas indirectly (e.g., by measuring the temperature of the exhaust pipe). The sensor 425 is communicatively coupled to the ECU 423 to provide a temperature signal (e.g., an electrical signal) to the ECU 423 associated with the temperature of the exhaust gas flowing through the exhaust gas pathway 404 at the position of the temperature sensor 425. In the illustrated embodiment, the temperature signal is associated with the temperature of the exhaust gas exiting the preliminary treatment (i.e. DOC) element 416.

Figure 10:
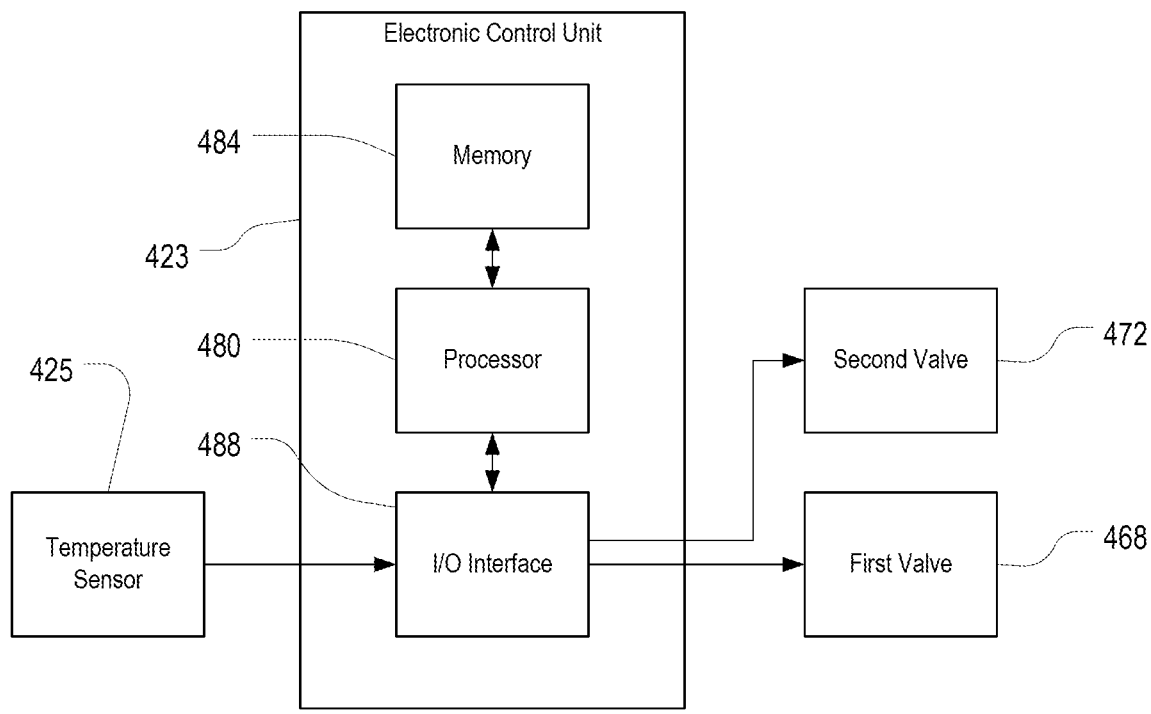
FIG. 10 is a block diagram of an electronic control unit of the exhaust gas treatment system of FIG. 9.

FIG. 10 illustrates an example of the ECU 423 for control of the exhaust gas treatment system 400. The ECU 423 includes a plurality of electrical and electronic components that provide power, operational control, and protection to the components and modules within the ECU 423. In particular, the ECU 423 includes, among other things, an electronic processor 480 (e.g., a programmable microprocessor, microcontroller, or similar device), non-transitory, machine-readable memory 484, and an input/output interface 488. The electronic processor 480 is communicatively coupled to the memory 484 and configured to retrieve from memory 484 and execute, among other things, instructions related to the control processes and methods described herein. In other embodiments, the ECU 423 includes additional, fewer, or different components. In the illustrated embodiment, the ECU 423 is communicatively coupled to the sensor 425, the first valve 468, and the second valve 472. The ECU 423 may also be configured to communicate with external systems including, for example, engine controls and/or operator controls.

In operation, untreated exhaust is directed into the exhaust pathway 404 at the inlet 408 (FIG. 9). The exhaust then flows through the preliminary treatment (DOC) element 416, which reduces some particulate matter, carbon monoxide, and hydrocarbons from the exhaust. Reductant may be introduced into the partially-treated exhaust downstream of the preliminary treatment element 416 via the first injector 448. The reductant and exhaust mixture then enters the first treatment element 420. The reductant reacts with $NO_x$ to form nitrogen and water, while soot is captured and oxidized on the porous filter substrate of the first treatment element 420. When the exhaust exits the first treatment element 420, additional reductant is introduced via the second injector 452. The reductant and exhaust mixture then enters the second treatment element 424, where the ammonia reacts with any remaining $NO_x$ in the SCR portion 428, and any unreacted ammonia is subsequently oxidized in the AOC portion 432. The treated exhaust then exits the exhaust gas treatment system 400 through the outlet 408.

$NO_x$ conversion efficiency in the first and second treatment elements 420, 424 is temperature dependent. $NO_x$ is reduced more efficiently at high exhaust temperatures (e.g., greater than about 400 degrees Celsius) experienced during normal engine operation than at low temperatures exhaust temperatures (e.g., less than about 350 degrees Celsius) experienced in cold ambient conditions and/or while the engine is warming up. Accordingly, it is advantageous to supply additional reductant in the exhaust pathway 404 via the first injector 448 at low temperatures, in order to enhance $NO_x$ reduction. At high exhaust temperatures, however, particles of precious metals from the preliminary treatment element 416 that have migrated downstream and attached to the porous filter substrate of the first treatment element 420 may oxidize the reductant supplied by the first injector 448, making it unavailable for $NO_x$ reduction. Accordingly, it is advantageous to reduce or shut off the supply of reductant through the first injector 448 at high temperatures.

Figure 11:
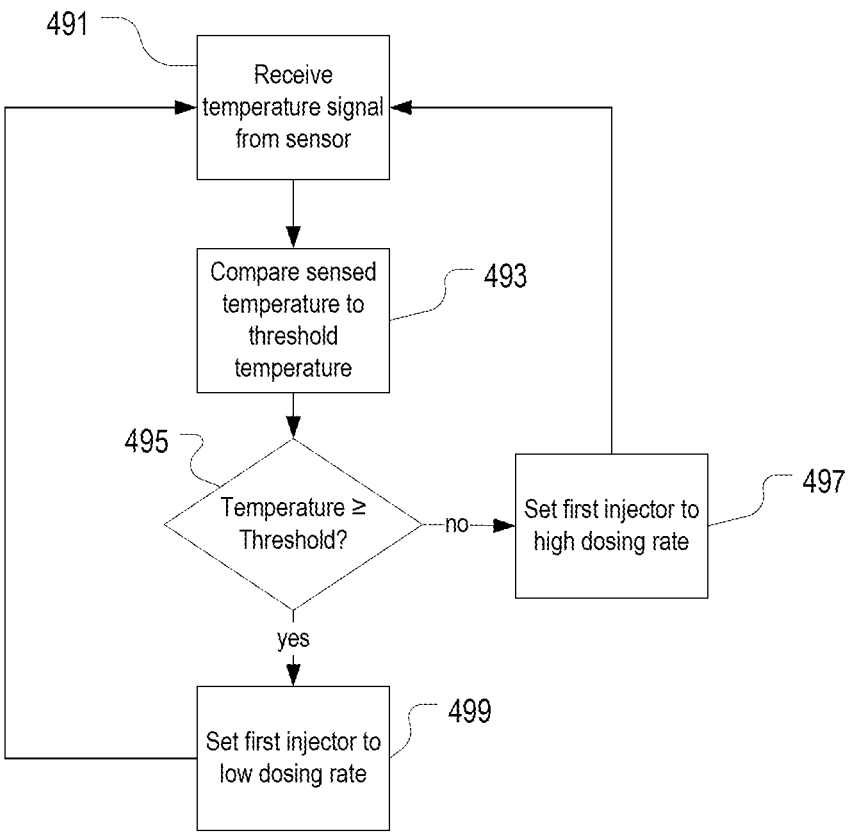
FIG. 11 is a flow diagram of operation of the exhaust gas treatment system of FIG. 9.

With reference to FIG. 11, the ECU 423 periodically or continuously receives the temperature signal from the sensor 425 at block 491 (e.g., via the input/output interface 488), which is indicative of the temperature of the exhaust gas exiting the preliminary treatment element 416. The ECU 423 uses the temperature signal to determine a sensed temperature of the exhaust gas. At block 493, the ECU 423 then periodically or continuously compares the sensed temperature with a threshold temperature, stored in memory 484. In some embodiments, the threshold temperature is between 350 degrees Celsius and 400 degrees Celsius. The threshold temperature may be predetermined, or may be calculated and periodically or continuously modified by the ECU 423 in response to feedback from one or more additional sensors.

If the sensed temperature is less than the threshold temperature, the ECU 423 sets the first injector 448 to a high dosing rate, at block 497, by increasing the flow rate of reductant through the first injector 448. For example, the ECU 423 may set the first injector 448 to the high dosing rate by opening the first valve 468. If the sensed temperature is greater than the threshold temperature, the ECU 423 sets the first injector 448 to a low dosing rate, at block 499, by decreasing the flow rate of reductant through the first injector 448. For example, the ECU 423 may set the first injector 448 to the low dosing rate by at least partially closing the first valve 468. In some embodiments, the low dosing rate is zero, such that no reductant flows through the first injector 448. In other embodiments, a minimal amount of reductant flows through the first injector 448 at the low dosing rate to keep the injector 448 cool.

In some embodiments, the ECU 423 may also vary the flow rate of reductant through the second injector 452 based on the sensed temperature. For example, the ECU 423 may reduce the flow rate of reductant through the second injector 452 when the sensed temperature is less than the threshold temperature because additional reductant is being provided by the first injector 448. Similarly, the ECU 423 may increase the flow rate of reductant through the second injector 452 when the sensed temperature is greater than or equal to the threshold temperature.

Thus, the ECU 423 of the exhaust gas treatment system 400 increases the flow of reductant through the first injector 448 to enhance $NO_x$ reduction at low temperatures when $NO_x$ reduction efficiency is impeded and decreases the flow of reductant through the first injector 448 to avoid parasitic reductant oxidation in the first treatment element 420 that may occur at high temperatures. In addition, decreasing the amount of reductant from the first injector 448 at high temperatures allows exhaust gas $NO_x$ to remain unreacted through the first treatment element 420. This enhances soot oxidation in the first treatment element 420, offering improved passive regeneration. This in turn reduces the need for active regeneration, which advantageously provides the exhaust gas treatment system 400 with a lower Infrequent Regeneration Adjustment Factor.

Various features of the disclosure are set forth in the following claims.

What is claimed is:

1. A method of treating exhaust gas from an internal combustion engine as the exhaust gas passes through an exhaust gas pathway, the method comprising:
   injecting reductant into the exhaust gas pathway at a first location;
   sensing a temperature of the exhaust gas at a position along the exhaust gas pathway;
   comparing the sensed temperature to a threshold temperature;
   injecting reductant into the exhaust gas pathway at a second location upstream of the first location and at a first rate in response to the sensed temperature being less than the threshold temperature; and
   injecting reductant into the exhaust gas pathway at the second location at a second rate less than the first rate in response to the sensed temperature being greater than or equal to the threshold temperature.

2. The method of claim 1, further comprising treating the exhaust gas with a first treatment element positioned in the exhaust gas pathway between the first location and the second location.

3. The method of claim 2, further comprising treating the exhaust gas with a second treatment element positioned in the exhaust gas pathway downstream of the first location.

4. The method of claim 1, wherein the threshold temperature is between 350 degrees Celsius and 400 degrees Celsius.

5. The method of claim 1, wherein the second rate is zero.

6. The method of claim 1, wherein the reductant includes at least one of diesel exhaust fluid (DEF) or gaseous ammonia.

7. A method of treating exhaust gas from an internal combustion engine as the exhaust gas passes through an exhaust gas pathway, the method comprising:
   injecting reductant, at a first rate, into the exhaust gas pathway at a first location;
   converting nitrogen oxides ($NO_x$) from the exhaust gas in a first treatment element positioned downstream of the first location;
   injecting reductant, at a second rate different than the first rate, into the exhaust gas pathway at a second location downstream of the first treatment element; and
   converting $NO_x$ from the exhaust gas in a second treatment element positioned downstream of the second location.

8. The method of claim 7, further comprising:
   sensing a temperature of the exhaust gas at a position along the exhaust gas pathway; and
   comparing the sensed temperature to a threshold temperature.

9. The method of claim 8, further comprising reducing the first rate in response to the sensed temperature being greater than or equal to the threshold temperature.

10. The method of claim 7, wherein the reductant includes at least one of diesel exhaust fluid (DEF) or gaseous ammonia.

11. The method of claim 7, further comprising filtering particulate material from the exhaust gas with the first treatment element.

12. The method of claim 7, further comprising treating the exhaust gas in a preliminary treatment element upstream of the first location.

\* \* \* \* \*